(No Model.)　　　　　　　　　　　　　　　　2 Sheets—Sheet 1.
R. GALLOWAY.
GEARING FOR GRAIN DRILLS.
No. 529,375.　　　　　　　　　　Patented Nov. 20, 1894.
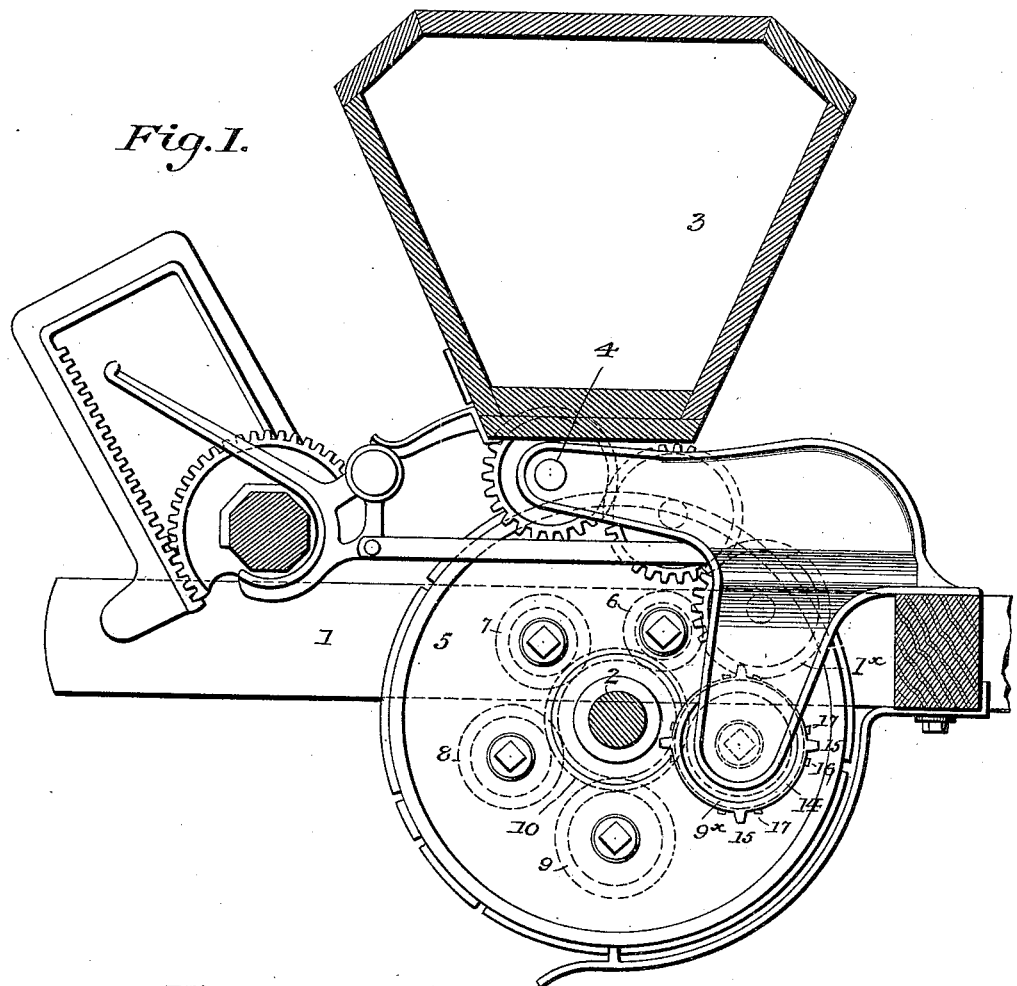
Witnesses
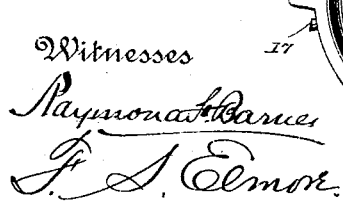
Inventor
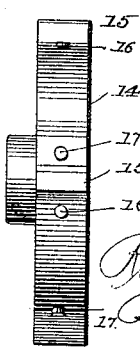

(No Model.)   2 Sheets—Sheet 2.

R. GALLOWAY.
GEARING FOR GRAIN DRILLS.

No. 529,375.   Patented Nov. 20, 1894.

Witnesses
Raymond H. Barnes
F. A. Elmore

Inventor
Robert Galloway
By P. J. Dodge
Attorney

UNITED STATES PATENT OFFICE.

ROBERT GALLOWAY, OF MACEDON, NEW YORK, ASSIGNOR TO THE BICKFORD & HOFFMAN COMPANY, OF NEW YORK.

GEARING FOR GRAIN-DRILLS.

SPECIFICATION forming part of Letters Patent No. 529,375, dated November 20, 1894.

Application filed June 9, 1894. Serial No. 514,066. (No model.)

*To all whom it may concern:*

Be it known that I, ROBERT GALLOWAY, of Macedon, county of Wayne, and State of New York, have invented a new and useful Improvement in Gearing for Grain-Drills, &c., of which the following is a specification.

The object of my invention is to provide a gearing by means of which an intermittent motion may be imparted from a continuously rotating shaft.

My invention is intended for use more particularly, but not necessarily, in connection with grain drills or other seeding machines wherein the ground wheels are geared to the seed distributing mechanism in such manner as to operate it continuously and uninterruptedly for the purpose of planting wheat, oats or like grains in rows. By the application of my invention to machines of this character, I adapt them for planting corn, beans and other seeds in hills by giving to the distributing mechanism an intermittent motion so that the feed of the seed instead of being continuous, will take place periodically, and at predetermined points corresponding to the location of the hills, &c.

My invention consists in providing between the continuously rotating driving shaft and the driven pinion for imparting motion to the seed distributing mechanism, an intermediate driving pinion of improved construction containing at intervals teeth adapted to mesh with the teeth on the driven pinion and to drive the same, the spaces between the teeth being inward of the "pitch line" and formed as more fully described hereinafter to prevent the "pointing" of the teeth of the pinions and to insure their certain and proper engagement.

The invention also consists in the details of construction and combination of parts hereinafter described and claimed.

Figure 3:
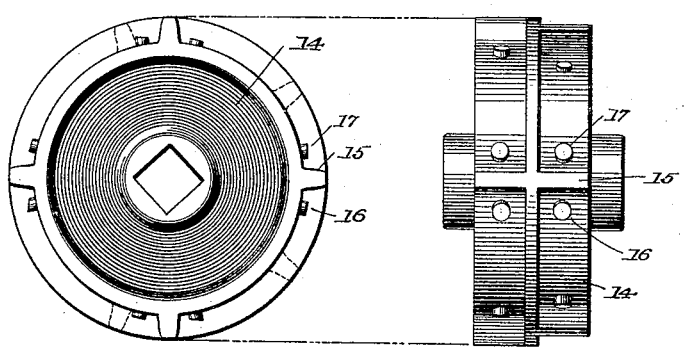
Figure 4:
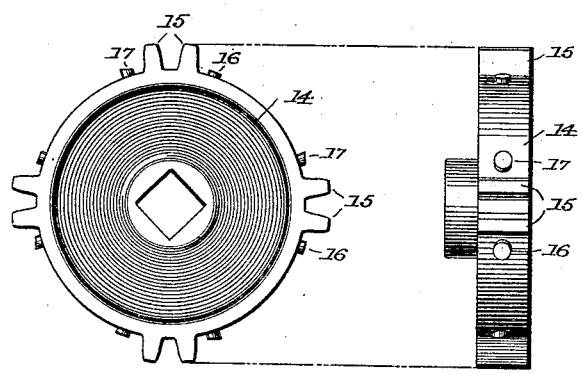

In the accompanying drawings, Figure 1 is a side elevation of a portion of a grain drill having my invention applied thereto. Fig. 2 is an elevation of the driving pinion removed. Fig. 3 is a view of a modification of the same. Fig. 4 is a view of still another modification.

I have represented for convenience of description my improvement as applied to a machine for planting wheat or oats, &c., the said machine being provided with a speed device for imparting to the seed distributing mechanism a continuous variable speed, such a device being described in Letters Patent of the United States, No. 345,018, dated July 6, 1886. It will be understood, however, that the application of my invention is not to be confined to a mechanism of this particular nature, but that it may be employed wherever an intermittent motion is to be imparted from a continuously rotating driving shaft.

1 represents a portion of the frame of the machine; 2, the driving axle receiving motion from the ground wheels; 3, the grain box provided as usual in its bottom with the grain distributing mechanism which is operated by a grain shaft 4, receiving a continuous motion from the axle of the machine through suitable intermediate gearing. In the present case the intermediate gearing comprises a shell 5, sustained to be adjusted around the axle and having journaled therein a series of pinions 6, 7, 8, 9 and $9^\times$ of varying diameters grouped around and meshing with a pinion 10 fixed to the axle. These pinions within the shell are provided with studs extending through the side of the same, where they are formed to receive a removable pinion which may be applied to one or the other of the internal pinions according to the speed required for driving the seed distributing mechanism. This removable pinion meshes with a driven pinion $1^\times$ which in turn gives motion through intermediate gearing to the grain shaft.

The foregoing parts constitute a variable speed gear for transmitting a variable continuous motion from the axle to the seed distributing mechanism, as described in said Letters Patent above referred to, and in themselves they form no part of the present invention, except in so far as hereinafter indicated.

In applying my invention to a mechanism of this character, I adapt the seed distributing mechanism to operate at predetermined times, thereby enabling a machine to be used for planting beans or other seeds at intervals or "in hills." This change is effected by replacing the ordinary removable pinion by a driving pinion 14, such as represented in Fig. 2. This pinion instead of being provided with a series of teeth extending uninterruptedly around its circumference, is formed at intervals only with teeth 15, the spaces between the teeth being smooth and inward of the "pitch line." As a result of this construction the driven pinion by being engaged by the teeth 15, will be moved intermittently and will impart a corresponding movement through the intermediate gearing to the distributing shaft. By varying the number of teeth on the driving pinion 14, the frequency of the operation of the seeding mechanism may be regulated according to the conditions encountered in practice.

In the use of the device as described when employed for planting beans, it has been found that after the operation of the distributing mechanism by one of the teeth on the driving pinion 14, a slight recoil will take place which being transmitted to the driven pinion $1^{\times}$ will cause the same to retreat slightly, the result being that when the next tooth of the driving pinion engages the teeth of the driven pinion, it will be apt to "point" therewith. To prevent this I locate in rear of each tooth on the driving pinion 14, a stop or recoil pin 16 so arranged with relation to the teeth that it will act as a stop to prevent the retreat of the driven pinion by encountering momentarily a tooth of the same after the disengagement of the active teeth of the pinions.

In order to take up any lost motion of the driven pinion to the end that the proper engagement of the teeth of the driving pinion therewith may be insured, I locate in advance of each tooth of the driving pinion a pin or baby tooth 17, which when the pinion is revolved will engage the teeth on the driven pinion and move the same slightly to a point where the proper engagement of the two pinions may take place with certainty. It will be thus seen that I am enabled to impart to the driven pinion an intermittent motion from a constantly revolving shaft and this with certainty and without danger or interruption by "pointing" or improper engagement of the teeth.

In Fig. 3 I have represented my improved gear as being embodied in a reversible pinion, one side of which contains four teeth while the other side contains 5. By the removal of a wheel of this character from the stud of the internal pinion, reversing it, and again fixing it in position, I may vary the frequency of the operation of the seed distributing mechanism.

Where the character of the seed distributing mechanism is such as to require a greater movement to effect its operation than that given by a single tooth of the driving pinion, I contemplate providing two or more teeth at intervals as shown in Fig. 4. The principle of operation is obviously the same here as in the first case described.

Having thus described my invention, what I claim is—

1. The combination with a continuously rotating driving pinion formed at intervals with teeth, between the teeth with smooth surfaces below the pitch line, and provided adjacent to the teeth with radial stop or recoil pins, of a driven pinion in position to be engaged by the teeth of the driving pinion; whereby the driven pinion will receive an intermittent motion and "pointing" will be prevented.

2. The combination with a continuously rotating driving pinion formed at intervals with teeth, between the teeth with smooth surfaces below the pitch line, and provided on opposite sides of the teeth with radial recoil pins and baby teeth, of a driven pinion in position to be engaged by the teeth of the driving pinion; whereby the driven pinion will receive an intermittent motion, "pointing" will be prevented and the proper engagement of the teeth of the two pinions insured.

In testimony whereof I hereunto set my hand, this 16th day of May, 1894, in the presence of two attesting witnesses.

ROBERT GALLOWAY.

Witnesses:
C. J. THISTLETHWAITE,
WAYNE GALLUP.